US012380490B2

(12) United States Patent
Pachigolla et al.

(10) Patent No.: US 12,380,490 B2
(45) Date of Patent: Aug. 5, 2025

(54) SYSTEMS AND METHODS FOR PERSONALIZED SHOPPING

(71) Applicant: Walmart Apollo, LLC, Bentonville, AR (US)

(72) Inventors: Venkata Janendra Pachigolla, Bangalore (IN); Chandresh Bhardwaj, Bangalore (IN); Deepak Mandya Chandranath, Bangalore (IN); Ramandeep Singh, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 329 days.

(21) Appl. No.: 17/725,299

(22) Filed: Apr. 20, 2022

(65) Prior Publication Data

US 2022/0335510 A1    Oct. 20, 2022

Related U.S. Application Data

(60) Provisional application No. 63/177,011, filed on Apr. 20, 2021.

(51) Int. Cl.
G06Q 30/0601    (2023.01)
G06Q 30/0207    (2023.01)
(Continued)

(52) U.S. Cl.
CPC ..... *G06Q 30/0643* (2013.01); *G06Q 30/0224* (2013.01); *G06Q 30/0633* (2013.01);
(Continued)

(58) Field of Classification Search
CPC .......... G06Q 30/0207; G06Q 30/0211; G06Q 30/0217; G06Q 30/0222–0224;
(Continued)

(56) References Cited

U.S. PATENT DOCUMENTS 9,196,003 B2   11/2015  Argue
9,229,664 B2   1/2016   Landa
(Continued)

OTHER PUBLICATIONS

Towards Identification of Packaged Products via Computer Vision: Convolutional Neural Networks for Object Detection and Image Classification in Retail Environments. IoT '19: Proceedings of the 9th International Conference on the Internet of Things Article No. 26, (Oct. 22, 2019) (Year: 2019).*

(Continued)

*Primary Examiner* — William J Allen
(74) *Attorney, Agent, or Firm* — Foley IP Law, PLLC

(57) ABSTRACT

In some embodiments, apparatuses and methods are provided herein useful to presenting information to customers. In some embodiments, an augmented reality system for presenting information to customers comprises a personalization server configured to store personalized data for the customers, receive an indication of a customer, receive a product identifier for a product, retrieve personalized data for the customer, and transmit the personalized data for the customer, an application configured to be executed by the mobile device, the application when executed by the mobile device causing the mobile device to capture images of products in a retail facility, receive user input to select the product from the images of products, receive the personalized data for the customer, generate an augmented reality presentation, and present the augmented reality presentation, and a control circuit configured to identify the product, and determine the product identifier for the product.

18 Claims, 4 Drawing Sheets

(51) Int. Cl.
*G06V 10/22* (2022.01)
*G06V 10/26* (2022.01)
*G06V 20/20* (2022.01)

(52) U.S. Cl.
CPC .......... *G06V 10/235* (2022.01); *G06V 10/267* (2022.01); *G06V 20/20* (2022.01)

(58) Field of Classification Search
CPC . G06Q 30/0235; G06Q 30/0237–0238; G06Q 30/0251; G06Q 30/0253–0261; G06Q 30/0267; G06Q 30/0269–0271; G06Q 30/0281; G06Q 30/0601–0643; G06V 10/26; G06V 10/267; G06V 10/235; G06V 20/10; G06V 20/20; G06V 20/35–36; G06T 19/003; G06T 19/006; H04W 4/024; H04W 4/029; H04W 4/23; H04W 4/30; H04W 4/33; H04W 4/35; G06F 3/017; G06F 3/048; G06F 3/0484; G06F 3/04842; G06F 3/0488; G06F 3/04883
See application file for complete search history.

(56) References Cited

U.S. PATENT DOCUMENTS

| | | | |
|---|---|---|---|
| 9,424,472 B2 | 8/2016 | So | |
| 9,519,923 B2 | 12/2016 | Calman | |
| 10,223,755 B2 | 3/2019 | Alapati | |
| 10,339,690 B2* | 7/2019 | Findlay | ................. G06V 10/17 |
| 10,777,017 B1* | 9/2020 | Saiger | ................... G06F 16/951 |
| 10,789,783 B2* | 9/2020 | Stansell | .................. G06T 19/20 |
| 11,257,297 B1* | 2/2022 | Go | ...................... G06Q 30/0643 |
| 11,544,760 B1* | 1/2023 | Ware | ..................... G06Q 30/0631 |
| 2009/0102859 A1 | 4/2009 | Athsani | |
| 2009/0285483 A1 | 11/2009 | Guven | |
| 2013/0147838 A1* | 6/2013 | Small | ...................... G06F 3/013 345/633 |
| 2013/0218721 A1 | 8/2013 | Borhan | |
| 2013/0286048 A1 | 10/2013 | Sternitzke | |
| 2014/0100994 A1* | 4/2014 | Tatzel | ................ G06Q 30/0276 705/27.1 |
| 2014/0149264 A1 | 5/2014 | Satyanarayana | |
| 2016/0110772 A1* | 4/2016 | Herring | .................. G07G 3/003 705/14.66 |
| 2016/0148292 A1* | 5/2016 | Gupta | ................. G06F 16/5838 705/26.61 |
| 2017/0249674 A1* | 8/2017 | Kerger | .................... G06Q 50/01 |
| 2018/0018708 A1 | 1/2018 | Locke | |
| 2018/0174122 A1 | 6/2018 | Mattingly | |
| 2020/0302510 A1 | 9/2020 | Chachek | |
| 2021/0056580 A1* | 2/2021 | Walker | ............... G06Q 30/0222 |
| 2021/0248669 A1* | 8/2021 | Wade | ...................... G06F 3/016 |
| 2021/0295047 A1* | 9/2021 | Furlan | ....................... G06T 7/74 |

OTHER PUBLICATIONS

S. You and U. Neumann, "Mobile Augmented Reality for Enhancing E-Learning and E-Business," 2010 International Conference on Internet Technology and Applications, Wuhan, China, 2010, pp. 1-4, doi: 10.1109/ITAPP.2010.5566168. (Year: 2010).*

* cited by examiner

SYSTEMS AND METHODS FOR PERSONALIZED SHOPPING

RELATED APPLICATIONS

This application claims the benefit of U.S. Provisional Application No. 63/177,011, filed Apr. 20, 2021, which is incorporated herein by reference in its entirety.

TECHNICAL FIELD

This invention relates generally to shopping and, more specifically, personalized shopping.

BACKGROUND

Many retailers have loyalty accounts and/or user accounts. Typically, retailers with such accounts will keep a record of a customer's purchases. In some instances, retailers use these purchase histories to make recommendations for customers and/or offer customers promotions. Additionally, customers may find it useful to view past purchases when making future purchases. For example, a customer may have enjoyed a product and would like to purchase the product again. However, the customer may not remember exactly what product they purchased. In such cases, the customer can view their purchase history to determine what product they previously purchased. While being able to view their purchase history can be useful to a customer, logging into a retailer's website or application and searching for a purchase history can be cumbersome.

BRIEF DESCRIPTION OF THE DRAWINGS

Disclosed herein are embodiments of systems, apparatuses, and methods pertaining to presenting information to customers while shopping. This description includes drawings, wherein.

Figure 1:
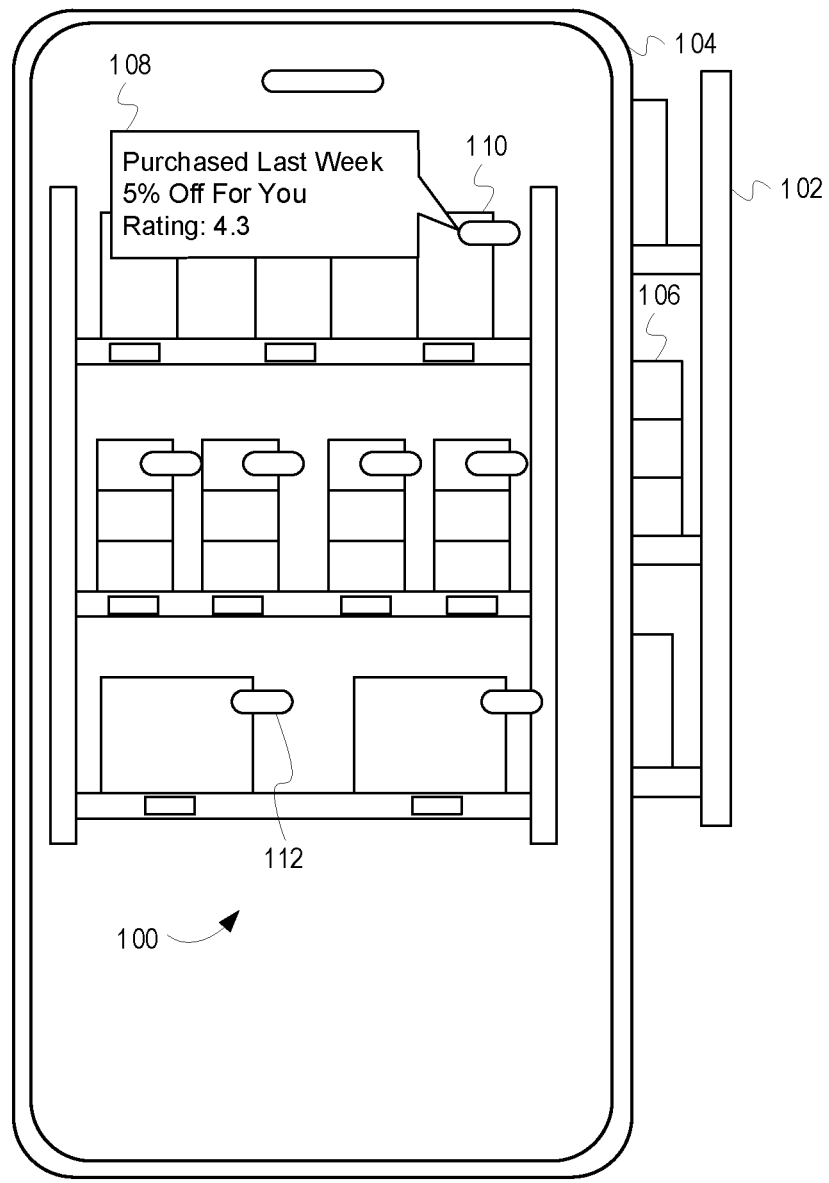
FIG. 1 depicts a mobile device 104 presenting information 108 to a customer while shopping, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to presenting information to customers while shopping. In some embodiments, an augmented reality system for presenting information to customers while shopping comprises a personalization server, wherein the personalization server is configured to store personalized data for the customers, receive an indication of a customer, receive a product identifier for a product, wherein the customer has selected the product via a mobile device, retrieve personalized data for the customer associated with the product, and transmit the personalized data for the customer associated with the product, an application configured to be executed by the mobile device, the application when executed by the mobile device causing the mobile device to capture, via a sensor of an image capture device, images of products in a retail facility, receive, via a user input device, user input to select the product from the images of products, receive, via a transceiver, the personalized data for the customer associated with the product, generate, via a processing unit, an augmented reality presentation, wherein the augmented reality presentation includes at least one of the images of the products in the retail facility and the personalized data for the customer associated with the product, and present, via a display device, the augmented reality presentation, and a control circuit, wherein the control circuit is configured to identify, based on the user input to select the product from the images of products, the product, and determine, based on the identification of the product, the product identifier for the product.

As previously discussed, many retailers have loyalty accounts and/or user accounts. Not only do such accounts allow customers to save their preferences, payment information, shipping addresses, etc., many retailers also maintain records of customers' purchases. These purchase histories can be valuable to both the customer and the retailer. For example, the customers may benefit from being able to review past purchases and receive promotions from retailers based on past purchases. Retailers may also benefit from the data collected regarding customers' purchasing habits. While this can be a win-win for both customers and retailers, the information that customers seek to obtain this value often requires work on the part of the customer. For example, a customer may need to log in to their account to view promotions that the retailer may be offering to the customer. As another example, a customer may need to log in to their account to review purchase histories to confirm the identity of a product that the customer is considering purchasing again.

Described herein are systems, methods, and apparatuses that seek to minimize the effort required for customers to take advantage of opportunities afforded by the storage of information about the customers' purchases. In one embodiment, a system provides an augmented reality presentation for customers. The augmented reality presentation includes personalized information about products (i.e., personalized data for a customer that is associated with a product). The personalized information can include, for example, a customer's purchase history for the product, a customer's rating for the product, promotions for the product (whether specific to the customer or generally available), etc. In such embodiments, the customer can use their mobile device to capture images or products in a retail facility. The mobile device generates an augmented reality presentation that includes the images of the products as well as personalized information about the products. The discussion of FIG. 1 provides an overview of such augmented reality presentations.

FIG. 1 depicts a mobile device 104 presenting information 108 to a customer while shopping, according to some embodiments. The mobile device 104 can be of any suitable type, such as a smartphone, a tablet computer, a personal digital assistant (PDA), a smart watch, etc. The customer uses the mobile device 104 to capture images of products while he or she is shopping in a retail facility. For example, the customer can capture images of a product display unit 102 and/or products 106 located on the product display unit 102. The product display unit 102 can include shelves, hanging baskets, or any other suitable structure for presenting products for sale.

The mobile device 104 generates an augmented reality presentation based on the images captured by the customer. The augmented reality presentation includes at least one image captured by the customer. The image can be a still image (e.g., a digital photograph) and/or a video image. Accordingly, the augmented reality presentation can be based on a still image and/or a video-based augmented reality presentation. The augmented reality presentation also includes the information 108. The information 108 can include personalize data for the customer, such as previous purchase information for the customer, the customer's rating for the product, a personalized promotion for the customer, inclusion information for the customer's cart (e.g., a virtual cart), inclusion information for the customer's wish list, suggestion for the customer based on the customers purchase and/or browsing history, etc.

In one embodiment, the augmented reality presentation includes a plurality of selection buttons 112. The selection buttons 112 can be associated with each of the products 106 included in the augmented reality presentation. When the customer selects one of the selection buttons 112, the augmented reality presentation presents the information 108 to the customer. For example, as depicted in FIG. 1, the customer has selected one of the selection buttons 112 associated with a product 110 in the top right of the augmented reality presentation. Because the customer has selected the selection button 112 associated with the product 110, the information 108 presented to the customer is associated with the product 110. For example, as depicted in FIG. 1, the information 108 includes the personalized data that the customer purchased the product 110 last week, is being offered a personalized promotion of 5% off the product 110, and has previously provided a rating of 4.3 for the product 110. It should be noted that, in some embodiments, the information 108 can include information in addition to, or in lieu of, the personalized data. For example, in some embodiments, the information 108 can include information about the product 110, such as a price of the product 110, inventory information for the product 110, dimensions for the product 110, other customer or average customer ratings for the product 110, products that complement the product 110, alternatives to the product 110, etc.

Figure 2:
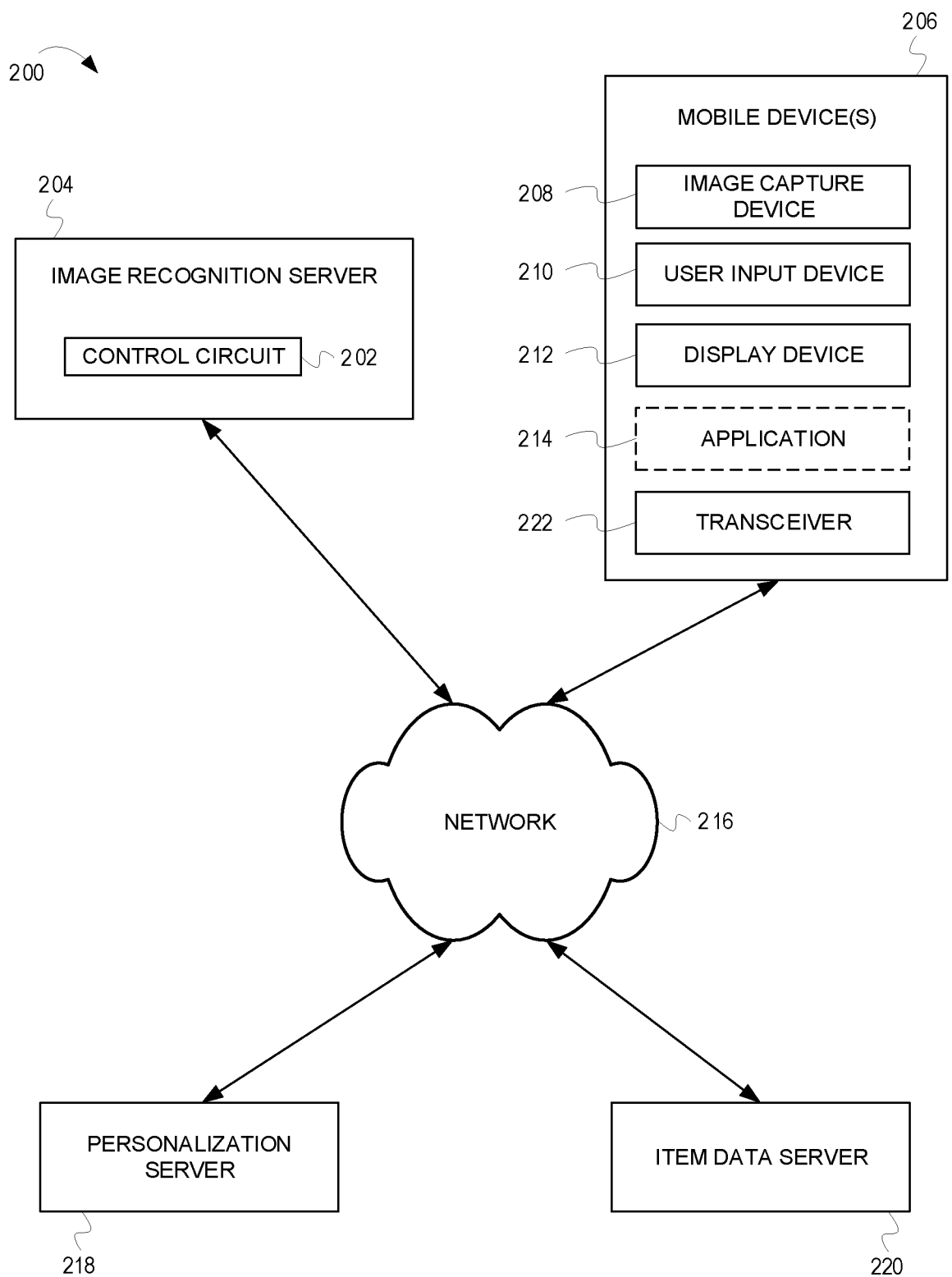
FIG. 2 is a block diagram of a system 200 for presenting information to customers while shopping, according to some embodiments.

While the discussion of FIG. 1 provides an overview of augmented reality presentations including information for customers, the discussion of FIG. 2 provides additional detail regarding a system for presenting information to customers via an augmented reality presentation.

FIG. 2 is a block diagram of a system 200 for presenting information to customers while shopping., according to some embodiments. The system 200 includes an image recognition server 204, a mobile device 206, a network 216, a personalization server 218, and an item data server 220. One or more of the image recognition server 204, the mobile device 206, personalization server 218, and item data server 220 are communicatively coupled via the network 216. The network 216 can include a local area network (LAN) and/or wide area network (WAN), such as the internet. Accordingly, the network 216 can includes wired and/or wireless links and transmit communications over any suitable protocol.

The mobile device 206 is generally possessed by a customer and can include any number of mobile devices 206. The mobile device 206 can be a smartphone, tablet computer, personal digital assistant, smart watch, etc. The mobile device 206 includes an image capture device 208, a user input device 210, a display device 212, and a transceiver 222. The mobile device 206 is configured to execute an application 214 via, for example a processor. The application 214 can be executed by the mobile device 206 in concert with other software modules or applications (i.e., computer program code), or groups of applications, such as operating systems, locationing applications (e.g., mapping, GPS, etc. applications), two-factor authentication applications (TFA), single sign on (S SO) applications, graphics processing applications, security applications, etc. In one embodiment, the application 214 is an augmented reality application, as described herein. In such embodiments, the application 214 can be a dedicated application (e.g., an application specific to a retailer or to augmented reality presentations) or a general purpose application that, while not a "dedicated application," can perform the functions described herein with respect to augmented reality presentations. In some embodiments, the application 214 is an add-on application installed on the mobile device 206 and that cooperates with other application(s) of the mobile device 206, such as the operating system and works with other application(s) to provide the functionality described herein. For example, in the embodiment illustrated in FIG. 2, the application 214 communicates with the operating system of the mobile device 206 to control and receive data from at least the display device 212, the user input device 210, and the image capture device 208. The mobile device 206 can store an instance of the application 214 in a memory structure, as described in more detail with respect to FIG. 4.

The image capture device 208 is generally configured to capture images of products. The image capture device 208 can be of any suitable type, and include components such as sensors, lens, apertures, etc. The user input device 210 is generally configured to receive user input. For example, the user input device 210 can receive user input selecting products from the image of the products, launching the application 214, making selections from the augmented reality presentation (e.g., of selection buttons), causing the image capture device 208 to capture images, etc. The display device 212 is generally configured to present augmented reality presentations. As discussed previously, the augmented reality presentation can be based on still images and/or video-based. The augmented reality presentation includes images of the products captured by the image capture device 208 as well as information for the products. In some embodiments, the information for the products includes personalized data for the customer associated with the products. The transceiver 222 is generally configured to transmit communications from, and receive communications by, the mobile device 206 (e.g., a communications radio). Accordingly, the transceiver can take any suitable form, and include circuitry and/or software for the transmission and receipt of information via, for example, a cellular network, a Wi-Fi network, a near field communications (NFC) protocol, etc.

The image recognition server 204 generally identifies products in the images (e.g., images of product display units captured by the mobile device 206) and segments the images based on the products. It should be noted, however, that in some embodiments the actions described herein with respect to the image recognition server 204 can be performed by the mobile device 206. That is, in some embodiments, the mobile device 206 can identify the products in the images and segment the images based on the products.

In some embodiments, the image recognition server 204 includes a control circuit 202. The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 performs various tasks with respect to the processing of the images. For example, the control circuit 202 can detect products within the images, determine boundaries for the products within the images, segment the image based on the determined boundaries, and associate the sections with the products included in each of the sections. In one embodiment, the control circuit 202 detects the products within the images via image recognition. The image recognition can be based on stored images of products and/or a machine learning model trained with training images. Additionally, or alternatively, the control circuit 202 can detect the products based on identifiers included in the image, such as text, computer readable identifiers (e.g., barcodes), etc. In such embodiments, the control circuit 202 can read the identifiers via, for example, optical character recognition, pattern recognition, etc.

After detecting the products in the image, the control circuit 202 determines boundaries for each of the products. The control circuit 202 can determine the boundaries of the product in any suitable manner. As one example, the control circuit 202 can identify the product as it is detected. For example, if detected based on image recognition or a read of an identifier, the control circuit 202 can identify the products. The control circuit 202 can then use the identifications of the products to retrieve product information. For example, the control circuit 202 can retrieve the product information from the item data server 220. In such embodiments, the item data server 220 stores product data for products offered for sale by a retail facility. The product data can include images of the products, prices for the products, inventory information for the products, dimensions for the products, availability of the products, weights of the products, etc. In such embodiments, the control circuit 202 can determine the boundaries for the products based on the dimensions for the products and the locations of the products in the image. As another example, the control circuit 202 can determine the boundaries for the products based on the recognized products. For example, because the control circuit 202 knows what the products are, the control circuit 202 knows what the products looks like and where the products end (i.e., the boundaries of the products). That is, the control circuit 202 has recognized the product via image recognition and thus an determine the boundaries of the product based on the recognized product in the image. As another example, the control circuit 202 may be able to determine the boundaries without identifying the products in the image. For example, gaps (e.g., dark or light spaces) may exist between the products and the gaps may signify the products boundaries, or a variation in colors between adjacent products may indicate the boundaries of the products.

The control circuit 202 next segments the images into sections. The control circuit 202 segments the images based on the boundaries such that one product is in each section. The control circuit 202 associates each of the products in included in the images with one of the sections. In this manner, when a customer selects a product (i.e., a location in the image), the product that has been selected can be determined (i.e., based on the location in the image that the customer selected). In one embodiment, the control circuit 202 transmits an indication of the associations between the products and the sections to one or more of the mobile devices 206.

The personalization server 218 is generally configured to store personalized data for customers. The personalized data for customers is data that is specific to one or more customers and can include any suitable data. For example, the personalized data can include previous purchase information for the customer, the customer's rating for the product, a personalized promotion for the customer, inclusion information for the customer's cart (e.g., a virtual cart), inclusion information for the customer's wish list, suggestion for the customer based on the customers purchase and/or browsing history, etc. The mobile device 206, or in some embodiments the control circuit 202, transmits an indication of a customer to the personalization server 218. For example, if the user has logged into the application 214 via their mobile device 206, the mobile device 206 can pass the log in information to the control circuit 202 and/or the personalization server 218. Additionally, the personalization server 218 receives a product identifier (i.e., an indication of a product) from one or more of the control circuit 202 and the mobile device 206. The personalization server 218 retrieves personalized data for the customer associated with the product based on the received indication of the customer and the product identifier. The personalization server 218 transmits the personalization data for the customer associated with the product to one or more of the control circuit 202 and the mobile device 206.

Figure 3:
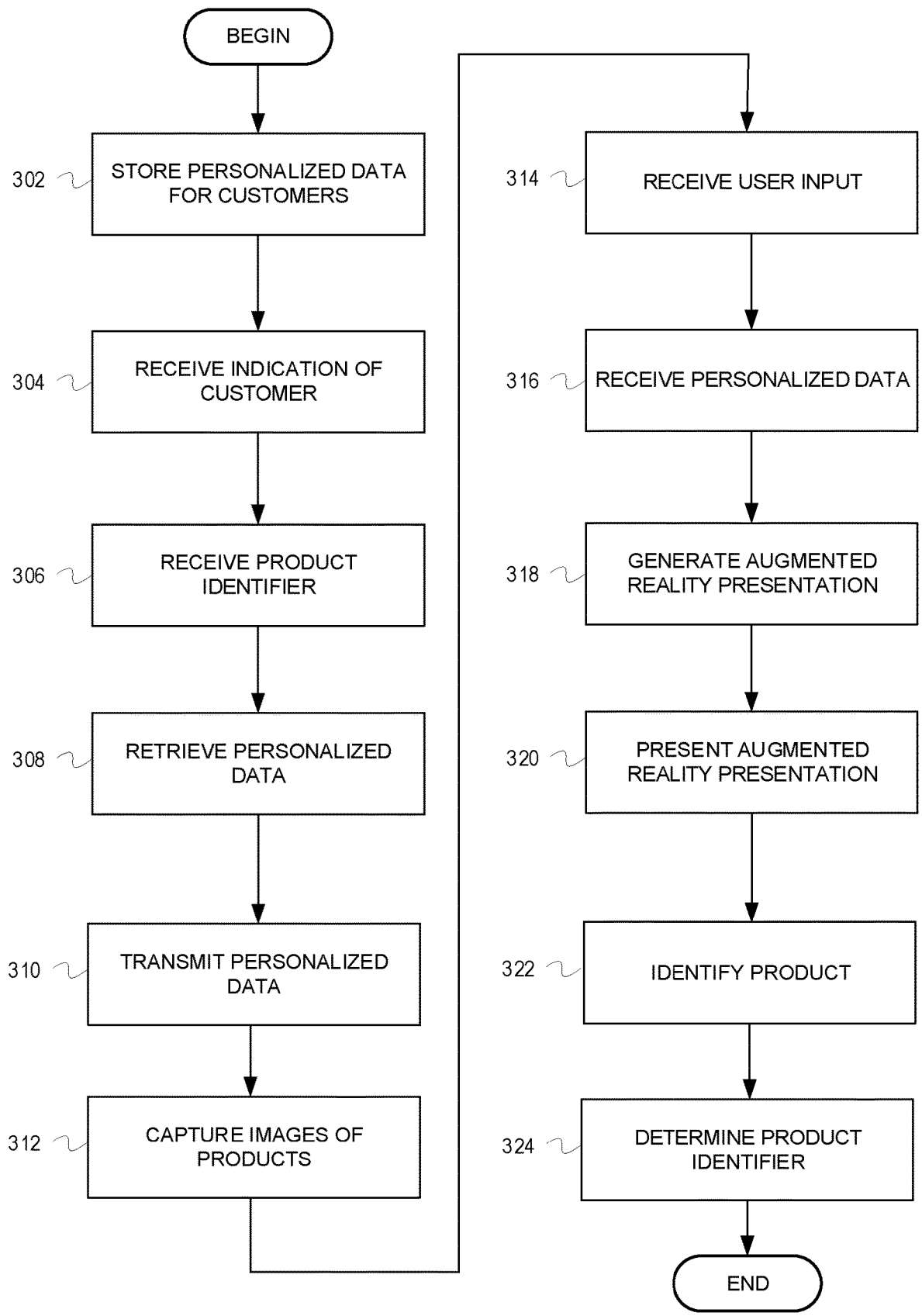
FIG. 3 is a flow chart depicting example operations for presenting information to customers while shopping, according to some embodiments.

While the discussion of FIG. 2 provides additional detail regarding a system for presenting information to customers via an augmented reality presentation, the discussion of FIG. 3 provides additional detail regarding the operations of such a system.

FIG. 3 is a flow chart depicting example operations for presenting information to customers while shopping, according to some embodiments. The flow begins at block 302.

At block 302, personalized data for customers is stored. For example, a personalization server can store the personalized data for customers. The personalized data can include, for example, previous purchase information for the customer, the customer's rating for the product, a personalized promotion for the customer, inclusion information for the customer's cart (e.g., a virtual cart), inclusion information for the customer's wish list, suggestion for the customer based on the customers purchase and/or browsing history, etc. The flow continues at block 304.

At block 304, an indication of a customer is received. For example, the personalization server can receive the indication of the customer. The indication of the customer can be explicit or implicit. For example, the indication of the customer can be explicit in that it is based on a log in or a customer identifier provided by the customer. The indication of the customer can be implicit, for example, if based on information associated with the customer and used to identify the customer, such as a phone number, a mobile device identifier (e.g., a MAC address), a customer number, etc. The personalization server can receive the indication of the customer from any suitable device, such as a mobile device, an image recognition server, etc. The flow continues at block 306.

At block 306, a product identifier is received. For example, the personalization server can receive the product identifier. The personalization server can receive the product identifier from any suitable device, such as the mobile device, the image recognition server, an item data server, etc. In one embodiment, another component of the system determines the customer identifier. For example, the mobile device, the image recognition server, etc. can detect products in an image captured by the mobile device. The detected products can be identified using any suitable technique, such as image recognition, text recognition, a read of a computer-readable identifier, etc. The flow continues at block 308.

At block 308, personalized data is retrieved. For example, the personalization server can retrieve the personalized data. The personalized data is for a customer and is associated with a product that the customer has selected (i.e., the product identified by the product identifier). The flow continues at block 310.

At block 310, the personalized data is transmitted. For example, the personalized data server can transmit the personalized data to the mobile device and/or the image recognition server. The flow continues at block 312.

At block 312, images of products are captured. For example, the mobile device can capture the images of products. In one embodiment, an application executing on the mobile device causes the mobile device to capture the images of the products. The images of the products can be still images and/or video images. The flow continues at block 314.

At block 314, user input is received. For example, the mobile device can receive user input via a user input device. In one embodiment, the application executing on the mobile device receives the user input. The user input selects a product from the images of the products. For example, if the image is of a product display unit including five products, the use input can select one of the five products. The flow continues at block 316.

At block 316, personalized data is received. For example, the mobile device can receive the personalized data from the personalization server. In one embodiment, the application executing on the mobile device receives the personalized data. The personalized data is for the customer (i.e., is data specific to the customer) and is associated with the selected product. The flow continues at block 318.

At block 318, an augmented reality presentation is generated. For example, the mobile device can generate the augmented reality presentation. In one embodiment, the application executing on the mobile device generates the augmented reality presentation. The augmented reality presentation includes at least one of the images of the products captured by the mobile device and the personalized data for the customer associated with the product. In some embodiments, the augmented reality presentation includes additional selections (e.g., buttons), menus, preferences, etc. For example, the augmented reality presentation can include selection buttons for the products, as well as menus that allow users to navigate information about the products and/or the retail facility. The flow continues at block 320.

At block 320, the augmented reality presentation is presented. For example, the mobile device can present the augmented reality presentation via a display device. In one embodiment, the application executing on the mobile device can cause presentation of the augmented reality presentation. The flow continues at block 322.

At block 322, a product is identified. For example, a control circuit can identify the product. The control circuit can be incorporated with the mobile device, image recognition server, etc. The control circuit can identify the product using any suitable technique. For example, the control circuit can identify the product based on image recognition, identifiers within the image of the products, text recognition, etc. The flow continues at block 324.

At block 324, a product identifier is determined. For example, the control circuit can determine the product identifier. The control circuit can, for example, determine the product identifier from the image of the products and/or by querying an item data server based on the identification of the product.

Figure 4:
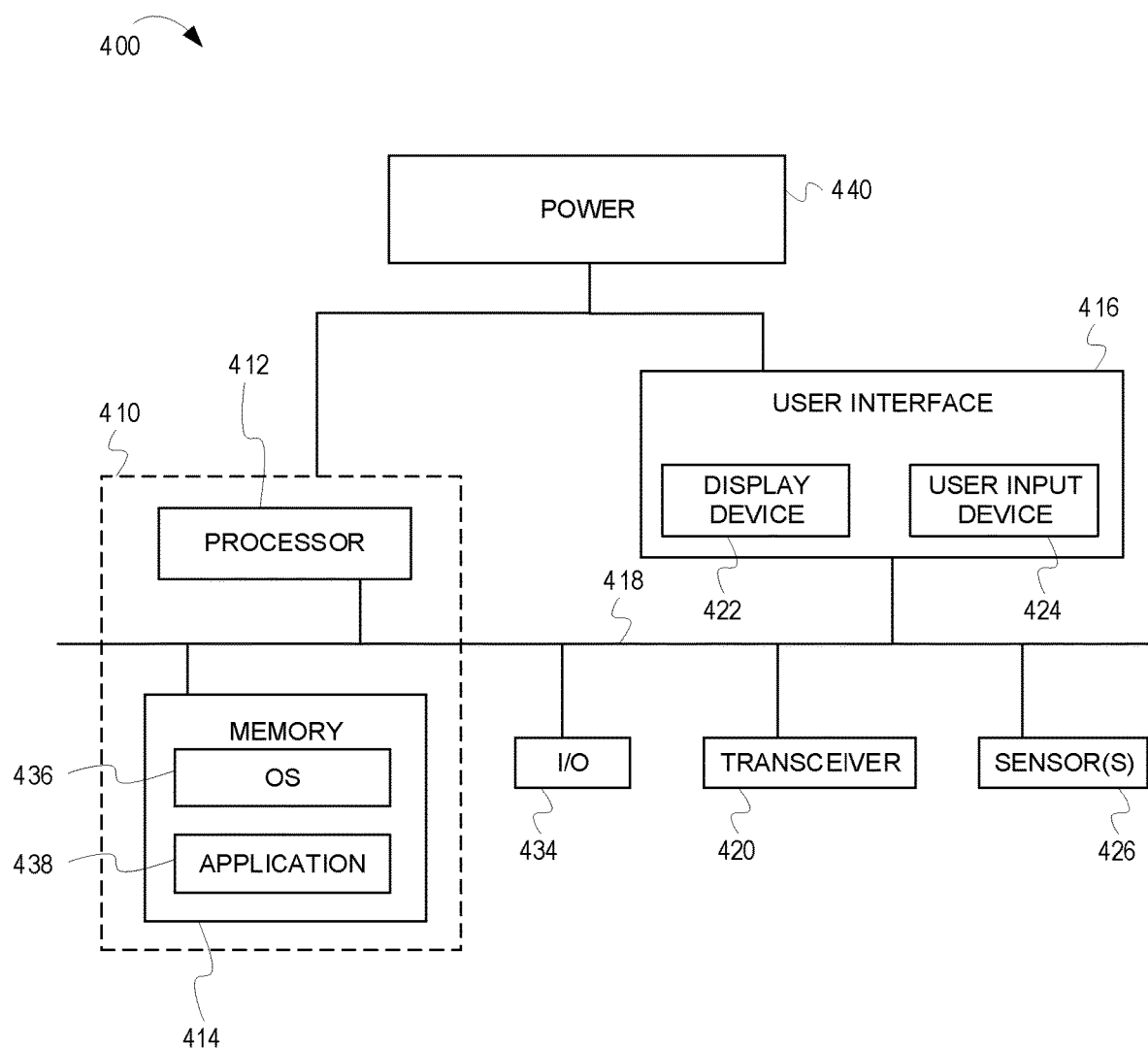
FIG. 4 is a block diagram of a mobile device 400, according to some embodiments.

While FIG. 3 provides additional detail regarding the operations of a system for presenting information to customers via an augmented reality presentation, the discussion of FIG. 4 provides additional detail regarding mobile devices.

FIG. 4 is a block diagram of a mobile device 400, according to some embodiments. The mobile device 400 may be used for implementing any of the components, systems, functionality, apparatuses, processes, or devices of the system 200 of FIG. 2, and/or other above or below mentioned systems or devices, or parts of such functionality, systems, apparatuses, processes, or devices. The systems, devices, processes, methods, techniques, functionality, services, servers, sources and the like described herein may be utilized, implemented and/or run on many different types of devices and/or systems.

By way of example, the mobile device 400 may comprise a control circuit or processor 412, memory 414, and one or more communication links, paths, buses or the like 418. Some embodiments may include one or more user interfaces 416, and/or one or more internal and/or external power sources or supplies 440. The control circuit can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the processor 412 can be part of control circuitry and/or a control system 410, which may be implemented through one or more processors with access to one or more memory 414 that can store commands, instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the mobile device 400 may be used to implement one or more of the above or below, or parts of, components, circuits, systems, processes and the like.

In one embodiment, the memory 414 stores data and executable code, such as an operating system 436 and an application 438. The application 438 is configured to be executed by the mobile device 400 (e.g., by the processor 412). The application 438 can be a dedicated application (e.g., an application dedicated to augmented reality presentations) and/or a general purpose application (e.g., a web browser, a retail application etc.). Additionally, though only a single instance of the application 438 is depicted in FIG. 4, such is not required and the single instance of the application 438 is shown in an effort not to obfuscate the figures. Accordingly, the application 438 is representative of all types of applications resident on the mobile device (e.g., software preinstalled by the manufacturer of the mobile device, software installed by an end user, etc.). In one embodiment, the application 438 operates in concert with the operating system 436 when executed by the processor 412 to cause actions to be performed by the mobile device 400. For example, with respect to the disclosure contained herein, execution of the application 438 by the processor 412 causes the mobile device to perform actions consistent with the presentation of augmented reality presentations as described herein.

The user interface 416 can allow a user to interact with the mobile device 400 and receive information through the system. In some instances, the user interface 416 includes a display device 422 and/or one or more user input device 424, such as buttons, touch screen, track ball, keyboard, mouse, etc., which can be part of or wired or wirelessly coupled with the mobile device 400. Typically, the mobile device 400 further includes one or more communication interfaces, ports, transceivers 420 and the like allowing the mobile device 400 to communicate over a communication bus, a distributed computer and/or communication network (e.g., a local area network (LAN), wide area network (WAN) such as the Internet, etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) ports 434 that allow one or more devices to couple with the mobile device 400. The I/O ports can be substantially any relevant port or combinations of ports, such as but not limited to USB, Ethernet, or other such ports. The I/O interface (i.e., I/O ports 434) can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the mobile device 400 may include one or more sensors 426 to provide information to the system and/or sensor information that is communicated to another component, such as the central control system, a delivery vehicle, etc. The sensors 426 can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, imaging system and/or camera, other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The mobile device 400 comprises an example of a control and/or processor-based system with the control circuit. Again, the control circuit can be implemented through one or more processors, controllers, central processing units, logic, software and the like. Further, in some implementations the control circuit may provide multiprocessor functionality.

The memory 414, which can be accessed by the control circuit, typically includes one or more processor-readable and/or computer-readable media accessed by at least the control circuit, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit. The external memory can be substantially any relevant memory such as, but not limited to, solid-state storage devices (SSDs) or drives, hard disk drives (HDDs), one or more of universal serial bus (USB) stick or drive, flash memory secure digital (SD) card, other memory cards, and other such memory or combinations of two or more of such memory, and some or all of the memory may be distributed at multiple locations over a computer network. The memory 414 can store code, software, executables, scripts, data, content, lists, programming, programs, log or history data, user information, customer information, product information, and the like. While FIG. 4 illustrates the various components being coupled together via a bus, it is understood that the various components may actually be coupled to the control circuit and/or one or more other components directly.

Further, it is noted that while FIG. 4 illustrates a generic architecture of the mobile device 400 in some embodiments, this similar architecture can apply to at least the control circuit 202 of FIG. 2. For example, the control circuit 202 could equate to the processor 412 of FIG. 4, and it is understood that the control circuit 202 would likewise be coupled to or have access to one or more of memories, power, user interfaces, I/Os, transceivers, sensors, etc.

In some embodiments, an augmented reality system for presenting information to customers while shopping comprises a personalization server, wherein the personalization server is configured to store personalized data for the customers, receive an indication of a customer, receive a product identifier for a product, wherein the customer has selected the product via a mobile device, retrieve personalized data for the customer associated with the product, and transmit the personalized data for the customer associated with the product, an application configured to be executed by the mobile device, the application when executed by the mobile device causing the mobile device to capture, via a sensor of an image capture device, images of products in a retail facility, receive, via a user input device, user input to select the product from the images of products, receive, via a transceiver, the personalized data for the customer associated with the product, generate, via a processing unit, an augmented reality presentation, wherein the augmented reality presentation includes at least one of the images of the products in the retail facility and the personalized data for the customer associated with the product, and present, via a display device, the augmented reality presentation, and a control circuit, wherein the control circuit is configured to identify, based on the user input to select the product from the images of products, the product, and determine, based on the identification of the product, the product identifier for the product.

In some embodiments, an apparatus, and a corresponding method performed by the apparatus, comprises storing, at a personalization server, personalized data for customers, receiving, at the personalization server, an indication of a customer, receiving, at the personalization server, a product identifier for a product, wherein the customer has selected the product via a mobile device, retrieving, by the personalization server, personalized data for the customer associated with the product, transmitting, by the personalization server, the personalized data for the customer associated with the product, causing capture, by an application executing on the mobile device via a sensor of an image capture device, of images of products in a retail facility, receiving, by the application executing on the mobile device via a user input device of the mobile device, user input to select the product from the images of the products, receiving, by the application executing on the mobile device via a transceiver of the mobile device, the personalized data for the customer associated with the product, generating, by the application executing on the mobile device via a processing unit of the mobile device, an augmented reality presentation, wherein the augmented reality presentation includes at least one of the images of the products in the retail facility and the personalized data for the customer associated with the product, causing presentation, by the application executing on the mobile device via a display device of the mobile device, of the augmented reality presentation, identifying, by a control circuit based on the user input to select the product from the images of the products, the product, and determining, by the control circuit based on the identification of the product, the product identifier for the product.

In some embodiment, an augmented reality system for presenting information to customers while shopping comprises a personalization server, wherein the personalization server is configured to store personalized data for the customers, receive, from a mobile device, an indication of a customer, receive, from the mobile device, a product identifier for a product, wherein the customer has selected the product via the mobile device, retrieve, based on the product identifier, personalized data for the customer associated with the product, and transmit, to the mobile device, the personalized data for the customer associated with the product, the mobile device, wherein the mobile device comprises an image capture device, wherein the image capture device is configured to capture images of products in the retail facility, a user input device, wherein the user input device is configured to receive user input to select the product from the images of the products, a transceiver, wherein the transceiver is configured to receive the personalized data for the customer associated with the product, a processing unit, wherein the processing unit is configured to generate an augmented reality presentation wherein the augmented reality presentation includes at least one of the images of the products in the retail facility and the personalized data for the customer associated with the product, and a display device, wherein the display device is configured to present the augmented reality presentation, and an image recognition server, wherein the image recognition server is configured to receive, from the mobile device, the images of the products, detect, based on the images of the products, one or more products included in the images of the products, determine, or the images of the products, boundaries for each of the one or more products, segment, based on the boundaries for each of the one or more products, the images of the products into sections, wherein each of the sections is associated with one of the or more products, receive, from the mobile device, an indication of an area of the images of the products, wherein the area includes the product, identify, based on the indication of the area of the images of the products and the sections, the product, determine, based on the identification of the product, the product identifier for the product, and transmit, to the mobile device, the product identifier for the product.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An augmented reality system for presenting information to customers while shopping, the system comprising:
   a personalization server, wherein the personalization server is configured to:
      store personalized data for the customers;
      receive an indication of a customer;
      receive a product identifier for a product, wherein the customer has selected the product via a mobile device;
      retrieve personalized data for the customer associated with the product; and
      transmit the personalized data for the customer associated with the product; and
   an application configured to be executed by the mobile device, the application when executed by the mobile device causing the mobile device to:
      capture, via a sensor of an image capture device, an image of products in a retail facility;
      detect, using a control circuit, each of the products in the image;

retrieve, using the control circuit from an item data server, dimension data for each product detected in the image;

determine, for each product detected in the image using the control circuit, a section of the image corresponding to the product using the retrieved dimension data for the product;

receive, via a user input device, user input to select the product from the image of products, the user input comprising a selection of an augmented reality presentation button associated with the section of the image corresponding to the product;

receive, via a transceiver, the personalized data for the customer associated with the product;

generate, via a processing unit, an augmented reality presentation, wherein the augmented reality presentation includes:

the image of the products in the retail facility and a plurality of the augmented reality presentation button each associated with one of the products, and the personalized data for the customer associated with the product selected via the user input; and present, via a display device, the augmented reality presentation; circuit, wherein the control circuit is configured to:

identify, based on the user input to select product from the image of products, the product; and determine, based on the identification of the product, the product identifier for the product.

2. The augmented reality system of claim 1, wherein the mobile device comprises the control circuit.

3. The augmented reality system of claim 1, the control circuit is further configured to:

determine, for the image of the products, boundaries for each of the products in the image using the retrieved dimension data;

segment, based on the boundaries for each of the products, the image of the products into the sections, wherein each of the sections is associated with one of the products;

receive, from the mobile device, an indication of an area of the image of the products, wherein the area includes the product; and transmit, to the mobile device, the product identifier for the product;

wherein the identification of the product is based on the indication of the area of the image of the products and the sections.

4. The augmented reality system of claim 1, wherein the personalized data for the customer associated with the product includes one or more of previous purchase information for the customer, a rating for the product by the customer, a personalized promotion for the customer, inclusion information for a cart of the customer, inclusion information for a wish list of the customer, and suggestions for the customer based on a browsing history of the customer.

5. The augmented reality system of claim 1, wherein:

the control circuit identifies the product and determines the product identifier for the product after selection of the augmented reality presentation button associated with the product; and each augmented reality presentation button is displayed on the image to partially overlap the product associated with the augmented reality presentation button.

6. The augmented reality system of claim 1, wherein the item data server is configured to:

store product data for products offered for sale by the retail facility;

receive the product identifier;

retrieve, based on the product identifier for the product, product data for the product; and transmit, to the mobile device for incorporation into the augmented reality presentation, product data for the product.

7. The augmented reality system of claim 6, wherein the product data for products includes one or more of prices, inventory status, dimensions, weights, availability, images, and instructions.

8. A method for presenting information to customers while shopping, the method comprising:

storing, at a personalization server, personalized data for customers;

receiving, at the personalization server, an indication of a customer;

receiving, at the personalization server, a product identifier for a product, wherein the customer has selected the product via a mobile device;

retrieving, by the personalization server, personalized data for the customer associated with the product;

transmitting, by the personalization server, the personalized data for the customer associated with the product;

causing capture, by an application executing on the mobile device via a sensor of an image capture device, of an image of products in a retail facility;

detecting, by a control circuit, each of the products in the image;

retrieve, by the control circuit from an item data server, dimension data for each product detected in the image;

determining, by the control circuit for each product detected in the image, a section of the image corresponding to the product using the retrieved dimension data for the product;

receiving, by the application via a user input device of the mobile device, user input to select the product from the image of the products, the user input comprising a selection of an augmented reality presentation button associated with the section of the image corresponding to the product;

receiving, by the application via a transceiver of the mobile device, the personalized data for the customer associated with the product;

generating, by the application via a processing unit of the mobile device, an augmented reality presentation, wherein the augmented reality presentation includes:

the image of the products in the retail facility and a plurality of the augmented reality presentation button each associated with one of the products, and the personalized data for the customer associated with the product selected via the user input;

causing presentation, by the application via a display device of the mobile device, of the augmented reality presentation;

identifying, by the control circuit based on the user input to select the product from the image of the products, the product; and determining, by the control circuit based on the identification of the product, the product identifier for the product.

9. The method of claim 8, wherein the mobile device comprises the control circuit.

10. The method of claim 8, further comprising:
determining, by the control circuit for the image of the products, boundaries for each of the products in the image using the retrieved dimension data;
segmenting, by the control circuit based on the boundaries for each of the products, the image of the products into the sections, wherein each of the sections is associated with one of the products;
receiving, by the control circuit from the mobile device, an indication of an area of the image of the products; and
transmitting, by the control circuit to the mobile device, the product identifier for the product;
wherein the identification of the product is based on the indication of the area of the image of the products and the sections.

11. The method of claim 8, wherein the personalized data for the customer associated with the product includes one or more of previous purchase information for the customer, a rating for the product by the customer, a personalized promotion for the customer, inclusion information for a cart of the customer, inclusion information for a wish list of the customer, and suggestions for the customer based on a browsing history of the customer.

12. The method of claim 8, wherein:
the control circuit identifies the product and determines the product identifier for the product after selection of the augmented reality presentation button associated with the product; and
each augmented reality presentation button is displayed on the image to partially overlap the product associated with the augmented reality presentation button.

13. The method of claim 8, further comprising:
storing, by the item data server, product data or products offered for sale by the retail facility;
receiving, by the item data server, the product identifier for the product;
retrieving, by the item data server based on the product identifier for the product, product data for the product; and
transmitting, to the mobile device for incorporation into the augmented reality presentation, the product data for the product.

14. The method of claim 13, wherein the product data for products includes one or more of prices, inventory status, dimensions, weights, availability, images, and instructions.

15. An augmented reality system for presenting information to customers while shopping, the system comprising:
a personalization server, wherein the personalization server is configured to:
store personalized data for the customers;
receive, from a mobile device, an indication of a customer;
receive, from the mobile device, a product identifier for a product, wherein the customer has selected the product via the mobile device;
retrieve, based on the product identifier, personalized data for the customer associated with the product; and
transmit, to the mobile device, the personalized data for the customer associated with the product;
wherein the mobile device comprises:
an image capture device, wherein the image capture device is configured to capture an image of products in a retail facility;
a user input device, wherein the user input device is configured to receive user input to select the product from the image of the products, the user input comprising a selection of an augmented reality presentation button associated with the product displayed on the image;
a transceiver, wherein the transceiver is configured to receive the personalized data for the customer associated with the product;
a processing unit, wherein the processing unit is configured to generate an augmented reality presentation, wherein the augmented reality presentation includes:
the image of the products in the retail facility and a plurality of the augmented reality presentation button each associated with one of the products, and,
the personalized data for the customer associated with the product selected via the user input; and
a display device, wherein the display device is configured to present the augmented reality presentation; and
an image recognition server, wherein the image recognition server is configured to:
receive, from the mobile device, the image of the products;
detect, based on the image of the products, the products included in the image of the products;
retrieve, from an item data server, dimension data for each product detected in the image;
determine, for the image of the products, boundaries for each of the products detected in the image using the retrieved dimension data for the product;
segment, based on the boundaries for each of the products, the image of the products into sections, wherein each of the sections is associated with one of the products;
receive, from the mobile device, an indication of an area of the image of the products, wherein the area includes the product;
identify, based on the indication of the area of the image of the products and the sections, the product;
determine, based on the identification of the product, the product identifier for the product; and
transmit, to the mobile device, the product identifier for the product.

16. The augmented reality system of claim 15, wherein the personalized data for the customer associated with the product includes one or more of previous purchase information for the customer, a rating for the product by the customer, a personalized promotion for the customer, inclusion information for a cart of the customer, inclusion information for a wish list of the customer, and suggestions for the customer based on a browsing history of the customer.

17. The augmented reality system of claim 15, wherein the item data server is configured to:
store product data for products offered for sale by the retail facility;
receive, from the mobile device, the product identifier;
retrieve, based on the product identifier for the product, product data for the product; and
transmit, to the mobile device for incorporation into the augmented reality presentation, product data for the product.

18. The augmented reality system of claim 17, wherein the product data for products includes one or more of prices, inventory status, dimensions, weights, availability, images, and instructions.

* * * * *